US008898574B2

(12) United States Patent
Hamilton, II et al.

(10) Patent No.: US 8,898,574 B2
(45) Date of Patent: Nov. 25, 2014

(54) DEGRADING AVATAR APPEARANCES IN A VIRTUAL UNIVERSE

(75) Inventors: Rick A. Hamilton, II, Charlottesville, VA (US); John P. Karidis, Ossining, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 12/339,412

(22) Filed: Dec. 19, 2008

(65) Prior Publication Data

US 2010/0162136 A1 Jun. 24, 2010

(51) Int. Cl.
*G06F 3/0481* (2013.01)
*H04L 29/06* (2006.01)
*G06Q 30/00* (2012.01)

(52) U.S. Cl.
CPC ............ *G06Q 30/00* (2013.01); *G06F 3/04815* (2013.01); *H04L 67/38* (2013.01)
USPC ............................. 715/748; 715/768; 345/419

(58) Field of Classification Search
USPC .................................. 715/848, 850, 757, 768
See application file for complete search history.

(56) References Cited

U.S. PATENT DOCUMENTS 6,091,410 A * 7/2000 Lection et al. ................ 715/706
6,329,986 B1 * 12/2001 Cheng ........................... 345/419
6,377,277 B1 * 4/2002 Yamamoto .................... 345/629
6,466,230 B1 * 10/2002 Edmark ......................... 345/629
6,545,682 B1 4/2003 Ventrella et al.
7,090,576 B2 8/2006 Herbrich et al.
7,155,680 B2 12/2006 Akazawa et al.
7,181,690 B1 2/2007 Leahy et al.
7,269,632 B2 * 9/2007 Edeker et al. ................ 709/217
7,538,775 B2 * 5/2009 Ishihara ........................ 345/592
2002/0002585 A1 * 1/2002 Matsuda ....................... 709/204
2003/0005439 A1 * 1/2003 Rovira ............................ 725/37
2004/0085356 A1 * 5/2004 Kake et al. ..................... 345/757
2006/0028475 A1 2/2006 Tobias
2006/0046844 A1 * 3/2006 Kaneko ........................... 463/32
2006/0143569 A1 6/2006 Kinsella et al.

(Continued)

OTHER PUBLICATIONS

Chittaro et al. "Is Semitransparency Useful for Navigating Virtual Environments?" VRST '01 Proceddings of the ACM Symposium on Virtual Reality Software and Technology. ACM 2001 pp. 159-166.*

(Continued)

*Primary Examiner* — Kieu Vu
*Assistant Examiner* — Blaine Basom
(74) *Attorney, Agent, or Firm* — William E. Schiesser; Keohane & D'Alessandro, PLLC

(57) ABSTRACT

An invention that degrades avatar appearances in a virtual universe is provided. In one embodiment, there is a degradation tool, including a visual obstruction component configured to: identify an object in the virtual universe as an object of interest, and determine whether a set of avatars within the virtual universe is likely to cause a visual obstruction of the object of interest to an avatar. The degradation tool further comprises a modification component configured to degrade an appearance of at least one of the set of avatars within the virtual universe if the set of avatars within the virtual universe is likely to cause a visual obstruction of the object of interest to the avatar.

16 Claims, 7 Drawing Sheets

(56) References Cited

U.S. PATENT DOCUMENTS

| | | |
|---|---|---|
| 2006/0293103 A1 | 12/2006 | Mendelsohn |
| 2007/0063999 A1* | 3/2007 | Park ............................. 345/419 |
| 2007/0113181 A1 | 5/2007 | Blattner et al. |
| 2007/0162863 A1 | 7/2007 | Buhrke et al. |
| 2007/0211047 A1 | 9/2007 | Doan et al. |
| 2009/0083627 A1* | 3/2009 | Onda et al. ................... 715/708 |
| 2009/0158161 A1* | 6/2009 | Gibbs et al. .................. 715/733 |

OTHER PUBLICATIONS

Yang, X. et al., "Hierarchical Animation Control of Avatars in 3-D Virtual Environments," IEEE Transactions on Instrumentation and Measurement, vol. 54, No. 3, Jun. 2005, pp. 1333-1341.

Gorniak, P., "Learning Avatar Behaviours," Project for MAS 732 (2000). Unpublished.

* cited by examiner

DEGRADING AVATAR APPEARANCES IN A VIRTUAL UNIVERSE

FIELD OF THE INVENTION

This invention relates generally to virtual universes and more specifically to the degradation of virtual content rendered in a virtual universe.

BACKGROUND OF THE INVENTION

Virtual universes or virtual worlds are computer-based simulated environments intended for its users or residents to inhabit and interact via avatars, which are personas or representations of the users of the virtual universes and generally take the form of two-dimensional or three-dimensional human or fantastical representations of a person's self. These types of virtual universes are now most common in massively multiplayer online games, such as Second Life®, which is a trademark of Linden Research Inc. in the United States. Avatars in these types of virtual universes, which can number well over a million, have a wide range of business and social experiences.

Many regions within a virtual universe contain complex environments with large numbers of objects and avatars. It is possible for these virtual universes to be quite complex, with each virtual universe or region within the virtual universe having a large number of avatars, objects, texts, and scripts for desired visual and functional effects. However, crowded and/or visually complex virtual universes can make it difficult for users to identify and distinguish objects in the virtual universe. In crowded regions within the virtual universe, e.g., virtual stores, a large group of avatars may occlude the vision of other avatars as they inspect products, signs, salespeople, etc. Additionally, many avatars in one location may slow the rendering rates for virtual universe clients.

SUMMARY OF THE INVENTION

In one embodiment, there is a method for degrading avatar appearances in a virtual universe. In this embodiment, the method comprises: identifying an object in the virtual universe as an object of interest; determining whether a set of avatars within the virtual universe is likely to cause a visual obstruction of the object of interest to an avatar; and degrading an appearance of at least one of the set of avatars within the virtual universe if the set of avatars within the virtual universe is likely to cause a visual obstruction of the object of interest to the avatar.

In a second embodiment, there is a computer system for degrading avatar appearances in the virtual universe, the system comprising at least one processing unit and memory operably associated with the at least one processing unit. A degradation tool is storable in memory and executable by the at least one processing unit. The degradation tool comprises a visual obstruction component configured to: identify an object in the virtual universe as an object of interest, and determine whether a set of avatars within the virtual universe is likely to cause a visual obstruction of the object of interest to an avatar. The degradation tool further comprises a modification component configured to degrade an appearance of at least one of the set of avatars within the virtual universe if the set of avatars within the virtual universe is likely to cause a visual obstruction of the object of interest to the avatar.

In a third embodiment, there is a computer-readable medium storing computer instructions, which when executed, enables a computer system to degrade avatar appearances in a virtual universe. In this embodiment, the computer instructions comprise: identifying an object in the virtual universe as an object of interest; determining whether a set of avatars within the virtual universe is likely to cause a visual obstruction of the object of interest to an avatar; and degrading an appearance of at least one of the set of avatars within the virtual universe if the set of avatars within the virtual universe is likely to cause a visual obstruction of the object of interest to the avatar.

In a fourth embodiment, there is a method for deploying a degradation tool for use in a computer system that degrades avatar appearances in a virtual universe. In this embodiment, a computer infrastructure is provided and is operable to: identify an object in the virtual universe as an object of interest; determine whether a set of avatars within the virtual universe is likely to cause a visual obstruction of the object of interest to an avatar; and degrade an appearance of at least one of the set of avatars within the virtual universe if the set of avatars within the virtual universe is likely to cause a visual obstruction of the object of interest to the avatar.

Figure 1:
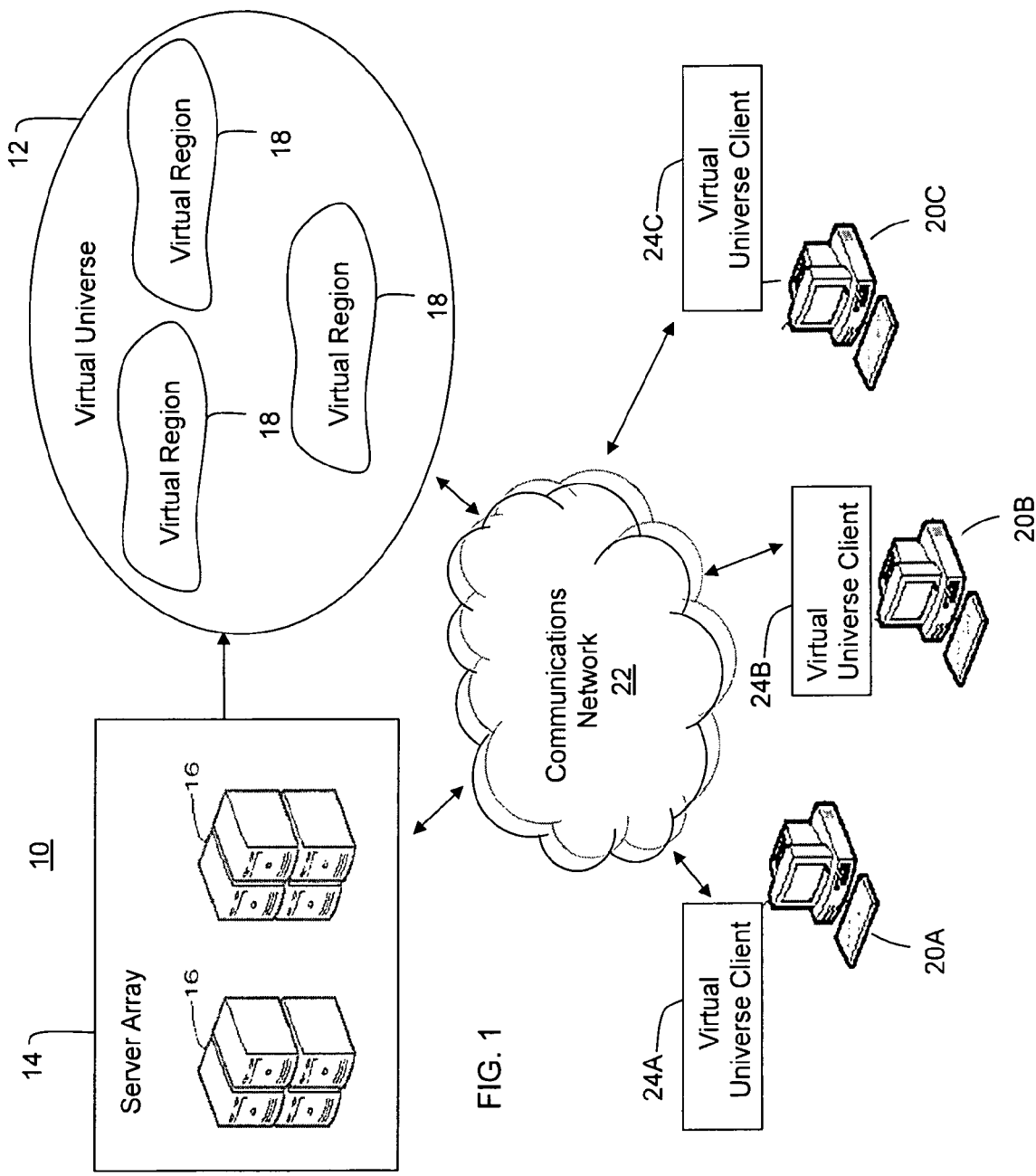
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to degrading avatar appearances in a virtual universe to make certain avatars less intrusive based on dynamic criteria. In these embodiments, a degradation tool provides the capability to provide an alternative representation of virtual content in a virtual universe. Specifically, the degradation tool comprises a visual obstruction component configured to: identify an object in the virtual universe as an object of interest, and determine whether a set of avatars within the virtual universe is likely to cause a visual obstruction of the object of interest to an avatar. The degradation tool further comprises a modification component configured to degrade an appearance of at least one of the set of avatars within the virtual universe if the set of avatars within the virtual universe is likely to cause a visual obstruction of the object of interest to the avatar.

FIG. 1 shows a high-level schematic diagram showing a networking environment 10 for providing a virtual universe (VU) 12 according to one embodiment of this invention in which a service for degrading avatar appearances in a virtual universe can be utilized. As shown in FIG. 1, networking environment 10 comprises a server array or grid 14 comprising a plurality of servers 16 each responsible for managing a portion of virtual real estate within VU 12. A virtual universe provided by a multiplayer online game, for example, can employ thousands of servers to manage all of the virtual real estate. The virtual content of VU 12 is comprised of a number of avatars and objects, each having associated texts/scripts defined in a programming language readable by VU 12. The virtual content is managed by each of servers 16 within server array 14 and may show up in VU 12 as a virtual region 18. Like the real-world, each virtual region 18 within VU 12 comprises a landscape having virtual content, such as buildings, stores, clubs, sporting arenas, parks, beaches, cities and towns all created by administrators or residents of the universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with VU 12 through a communications network 22 via virtual universe clients 24A-24C (hereinafter referred generally as 24) that reside in computers 20, respectively. Below are further details of VU 12, server array 14, and virtual universe client 24.

Figure 2:
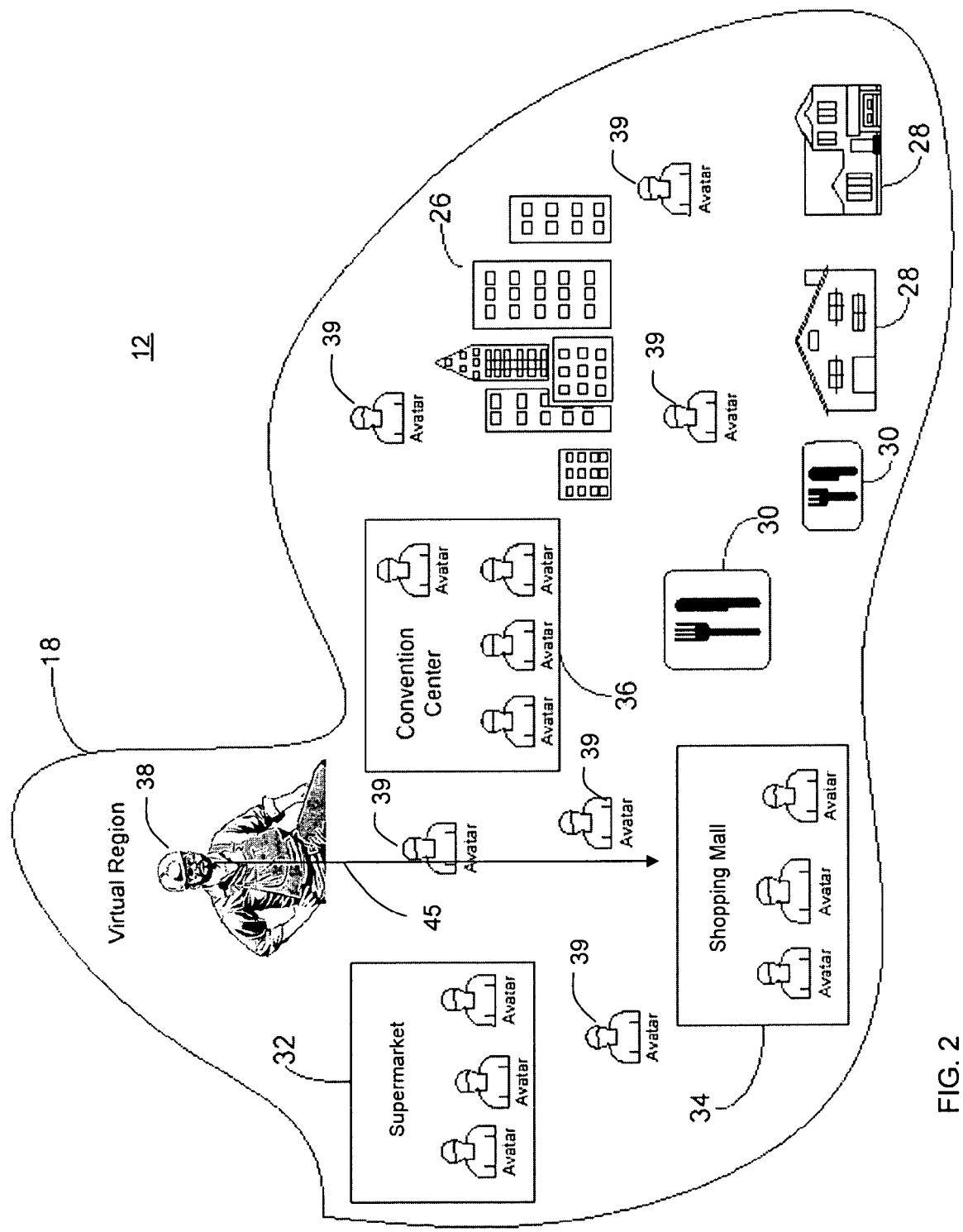
FIG. 2 shows a more detailed view of a virtual region shown in the virtual universe of FIG. 1.

FIG. 2 shows a more detailed view of what one virtual region 18 in VU 12 may comprise. As an example, virtual region 18 shown in FIG. 2 comprises a downtown office center 26, homes 28, restaurants 30, a supermarket 32 and a shopping mall 34 for shopping, and a convention center 36 for meetings and various conventions. Residents or avatars, which as mentioned above, are personas or representations of the users of the virtual universe, roam all about the virtual region by walking, driving, flying or even by teleportation or transportation, which is essentially moving through space from one point to another, more or less instantaneously. The present invention will hereinafter be described in the context of an exemplary avatar 38 and a set of avatars 39 for the sake of clarity. Set of avatars 39 represent other avatars/users within the virtual universe that may also traverse virtual region 18. However, it will be appreciated that the methods described herein for degrading avatar appearances apply broadly to avatar 38 and set of avatars 39. Further, virtual region 18 is not limited to the embodiment shown, and can have any number of avatars and objects that can be found in real-life as well as the virtual world.

Figure 3:
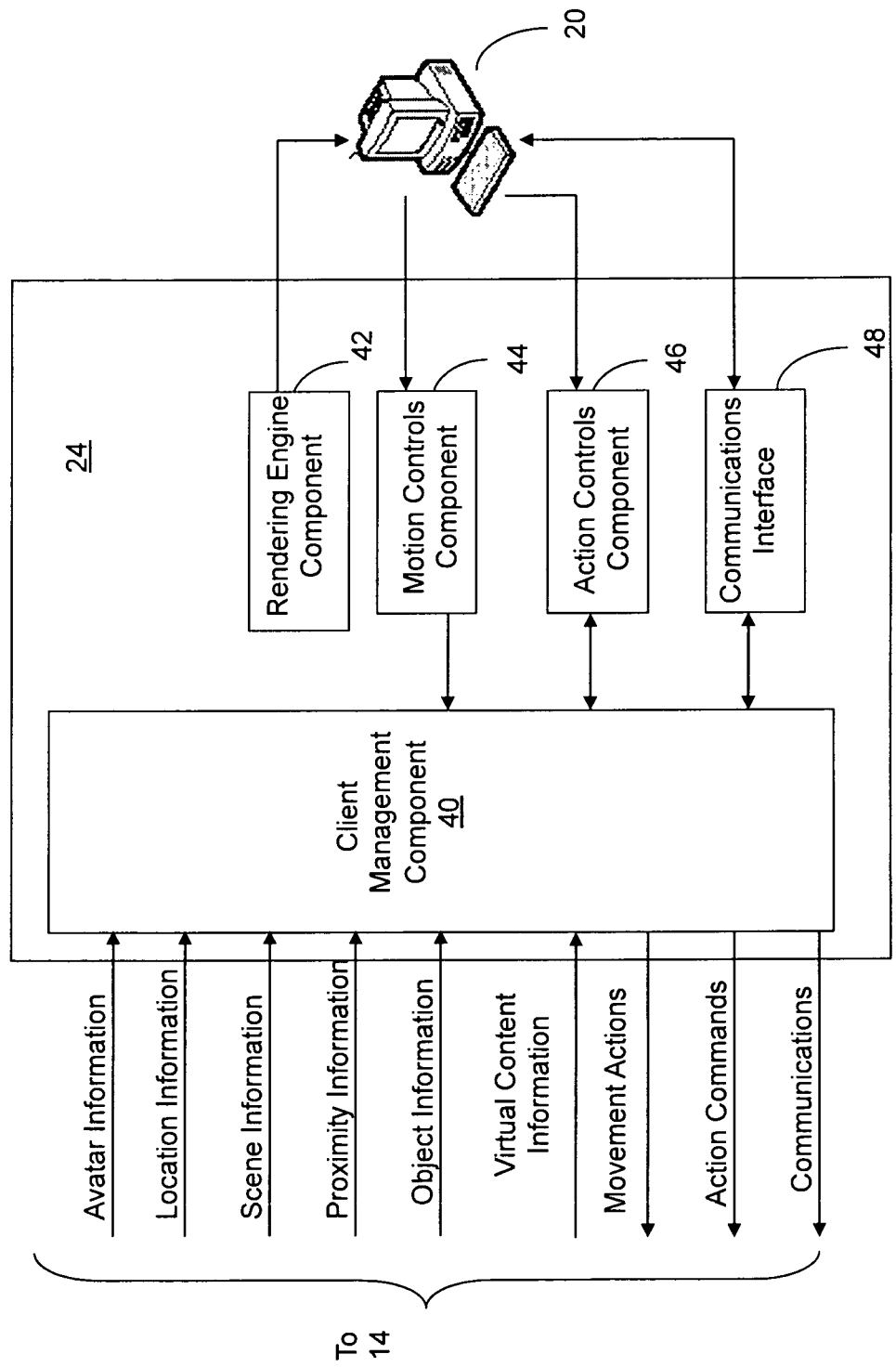
FIG. 3 shows a more detailed view of the virtual universe client shown in FIG. 1.

FIG. 3 shows a more detailed view of virtual universe client 24 shown in FIG. 1. Virtual universe client 24, which enables users to interact with VU 12, comprises a client management component 40, which manages actions, commands and communications made by a user through computer 20, and information received from the virtual universe through server array 14. A rendering engine component 42 enables the user of computer 20 to visualize his or her avatar within the surroundings of the particular region of VU 12 that the avatar is presently located. As will be further described herein, rendering engine 42 receives an alternative representation of virtual content (e.g., a degraded avatar appearance) in VU 12 and renders it for display to the user of computer 20.

A motion controls component 44 enables the user's avatar(s) to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of VU 12 through modalities such as chatting, instant messaging, gesturing, talking and electronic mail (e-mail).

FIG. 3 shows the various types of information received by client management component 40 from the virtual universe through the server array 14. In particular, client management component 40 receives avatar information about the avatars that are in proximity to the user's avatar, as well as information about the avatars that are in proximity to objects of interest in the virtual universe. In addition, client management component 40 receives location information about the area that the user's avatar is near (e.g., what region or land the avatar is in), as well as scene information (e.g., what the avatar sees along a line of sight). Client management component 40 also receives proximity information, which contains information on what the user's avatar is near, and virtual content information, which is information about the objects, texts, and scripts of the virtual content renderable in the virtual universe. FIG. 3 also shows the movement commands and action commands that are generated by the user and sent to the server array via client management component 40, as well as the communications that can be sent to the users of other avatars within the virtual universe.

Figure 4:
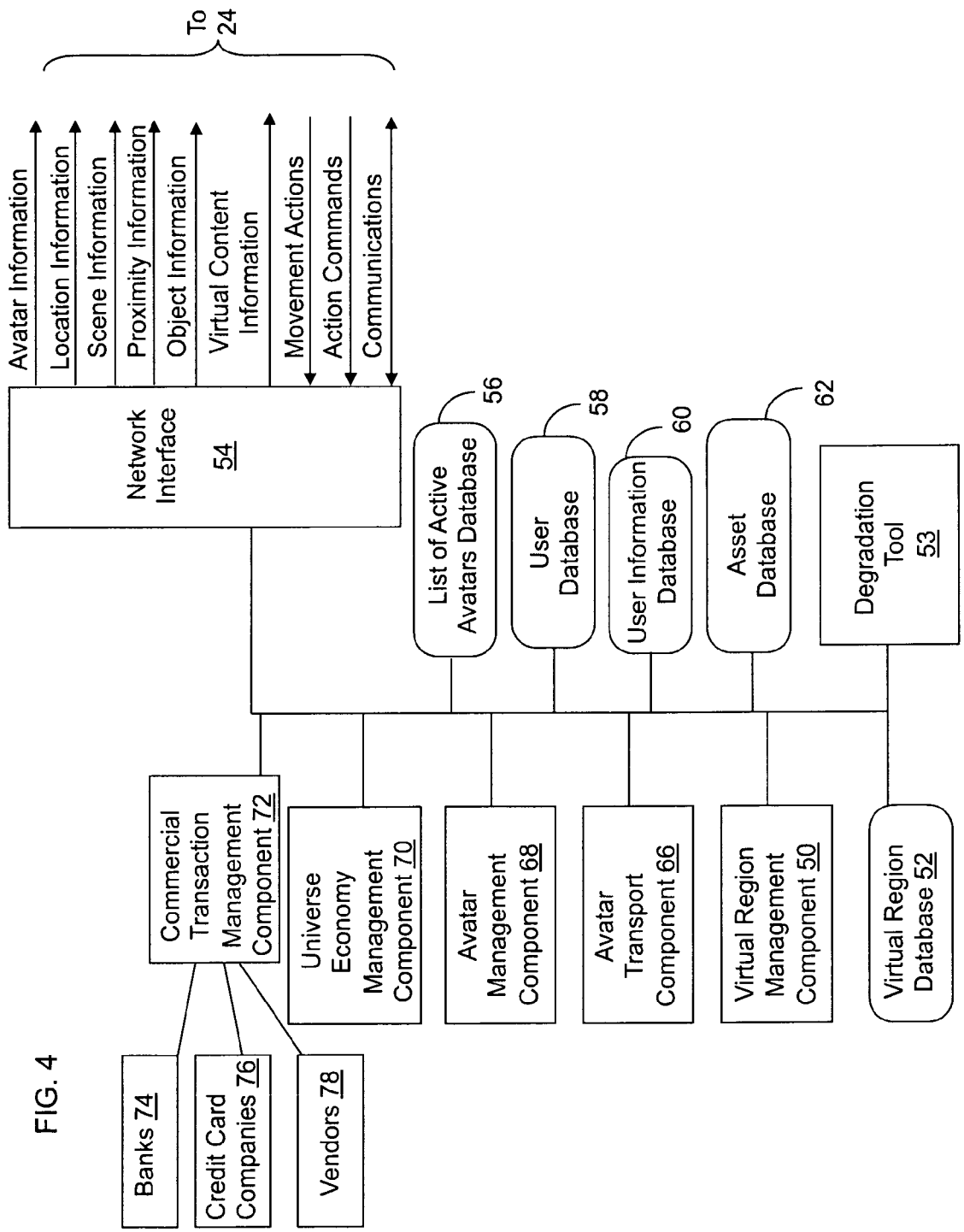
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates avatar, location, scene, proximity, and virtual content information to the user through virtual universe client 24. The network interface receives movement and action commands, as well as communications from the user via virtual universe client 24.

FIG. 4 also shows a degradation tool 53, which provides the capability to provide alternative representations of virtual content renderable in the virtual universe by degrading the appearance of certain avatars in the virtual universe, as will be further described below. In this embodiment, degradation tool 53 resides on the same computer system as virtual universe client 24. However, it can be appreciated that in other embodiments, degradation tool 53 may reside on the same side as servers 16, or reside on separate computers in direct communication with the virtual universe servers 16 and virtual universe clients 24.

As shown in FIG. 4, there are several different databases for storing information. In particular, virtual region database 52 stores information on all of the specifics in the virtual region that virtual region management component 50 is managing. Virtual region database 52 contains metadata information about the objects, texts and scripts associated with the virtual content in the virtual region(s) of VU 12. List of active avatars database 56 contains a list of all the avatars that are online in the VU 12, while databases 58 and 60 contain information on the actual human users of VU 12. In one embodiment, user database 58 contains general information on the users such as names, email addresses, locales, interests, ages, preferences, etc., while user information database 60 contains more sensitive information on the users such as billing information (e.g., credit card information) for taking part in transactions.

Asset database 62 contains information on the avatars of the users that reside in VU 12. In one embodiment, asset database 62 contains information on the virtual content within the personal inventories of each avatar of the virtual universe. An illustrative but non-limiting listing of the virtual content that can be present in asset database 62 includes avatar accessories (e.g., clothing), virtual pets, vehicles, electronic media (e.g., music files), graphics files, sound files, animations, electronic documents, video files, avatar body parts, avatar tools, calling cards, note cards, photos and photo albums, or any other type of virtual content.

Those skilled in the art will also recognize that databases 56-62 may contain additional information if desired. Databases 56-62 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, databases 56-62 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which as mentioned above, allows avatars to transport through space from one point to another point, instantaneously. As a result, an avatar could for example travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, VU 12 will have its own VU currency ($VU) that users pay for with real-life money. The users can then take part in commercial transactions for their avatars through universe economy management component 70. For example, an avatar might want to pay for a service that provides degradation of avatar appearances within the virtual universe. In this case, the avatar would make the purchase of this service using the $VU. In another example, a user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not an avatar. In order to fulfill this type of transaction and others similarly related, commercial transaction management component 72 interacts with banks 74, credit card companies 76 and vendors 78.

Figure 5:
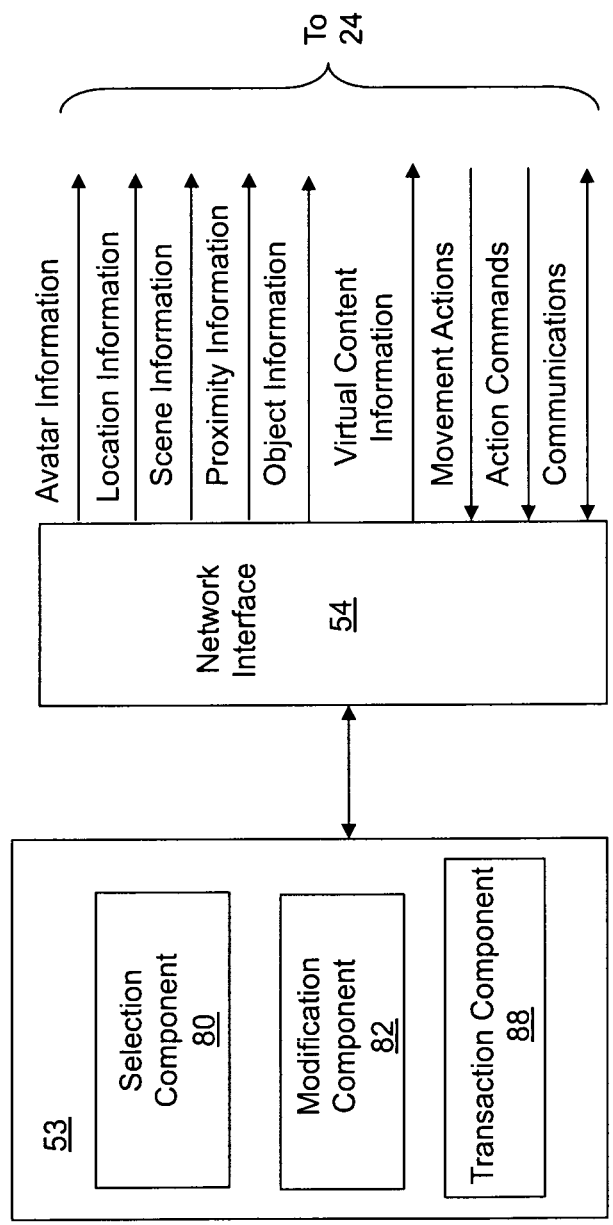
FIG. 5 shows a degradation tool according to one embodiment of this invention that operates in the environment shown in FIG. 1.

Referring now to FIGS. 2 and 5, degradation tool 53 according to embodiments of the invention will be described in further detail. As shown, degradation tool 53 comprises a visual obstruction component 80 configured to identify an object in the virtual universe as an object of interest. As will be further described below, in various embodiments, objects of interest may be specified based on explicit predefined objects, inferred interests due to communication triggers, social tags, inventory objects, or previous interest in certain subject areas or objects.

Visual obstruction component 80 is configured to determine whether set of avatars 39 is likely to cause a visual obstruction of the object of interest to avatar 38. In one approach, visual obstruction component establishes a line of sight 45 (FIG. 2) between avatar 38 and an object of interest in VU 12 (e.g., supermarket 32, shopping mall 34, etc.). To accomplish this, visual obstruction component 80 determines the location/direction where avatar 38 is currently looking, or likely to look next, and establishes this as line of sight 45. Line of sight 45 refers to the visibility of certain virtual content, such as any number of objects in virtual universe 12.

In another embodiment for determining whether set of avatars 39 is likely to cause a visual obstruction of the object of interest to avatar 38, visual obstruction component 80 counts the total number of avatars within a predetermined proximity to the object of interest to determine if a visual obstruction of the object is likely. For example, if the number of avatars surrounding the object of interest exceeds a predefined threshold value, regardless of whether or not a current visual obstruction is occurring, visual obstruction component 80 determines that a visual obstruction is likely based on the probability that one or more avatars will subsequently travel into line of sight 45.

Next, if visual obstruction component 80 determines that a visual obstruction of the object of interest is likely, degradation tool 53 may invoke degraded avatar renderings for the occluding avatars. In one embodiment, degradation tool 53 comprises a modification component 82 configured to degrade the appearance of at least one of set of avatars 39 within VU 12 if set of avatars 39 within VU 12 is likely to cause a visual obstruction of the object of interest to avatar 38. Specifically, modification component 82 is configured to degrade the appearance of at least one of set of avatars 39 within VU 12 if set of avatars 39 is posited in line of sight 45, which extends between avatar 38 and the object of interest. For example, as shown in FIG. 2, at least one of set of avatars 39 is touching (i.e., positioned in) line of sight 45 from avatar 38 to the object of interest, in this case, shopping mall 34. Therefore, modification component 82 degrades the appearance of the occluding avatar to increase the visibility of shopping mall 34 to avatar 38.

A variety of degradation rendering approaches may be employed to degrade the appearance of the avatar(s) including, but not limited to: reduction of at least one geometric dimension of the avatar (e.g., wireframe rendering, polygon reduction, "stickman" rendering, thin cylinders, etc.), or adjustment of a transparency level of the avatar. It can be appreciated that each degradation type represents potential approaches and degrees of simplifying that may be rendered singly or in combination, and are not intended to limit the scope of the invention. For example, in one embodiment, a policy table may be used to provide a series of occluding avatars at multiple levels of degradation.

Degradation tool 53 of the present invention is not limited in the type or amount of objects that may be specified by visual obstruction component 80 as objects of interest. For example, in one embodiment, a non-limiting listing of objects considered objects of interest includes, but is not limited to: an object in the virtual universe that is being viewed by the avatar, at least one of the set of avatars that has had a past interaction with the avatar, an object in the virtual universe that is being viewed by a plurality of avatars from the set of avatars, an object in the virtual universe within a rendering radius of a plurality of avatars from the set of avatars, an object selected by the avatar as an object of interest, an object that matches metadata in the personal inventory of the avatar, an object selected by an administrator of the virtual universe, an object in which an entity associated with the object (e.g., object owner, object creator, or a third-party) has paid a fee, or virtually any other object in the virtual universe that is capable of being visually recognized by an avatar.

These objects of interest may be specified using a variety of approaches. In one embodiment, objects that are considered community objects, i.e., objects of interest to multiple avatars, can be specified as objects of interest. For example, objects that are within a rendering radius of a defined percentage of avatars within the virtual universe may be selected as objects of interest. In another example, objects that are presently being viewed by a predefined number of avatars in the virtual universe may be considered community objects and selected as objects of interest.

In another embodiment, avatars that are known to a user through specification of a "friends list" or through past interactions and communications (e.g., chat, e-mail, etc.) may be selected as objects of interest. Additionally, degradation tool 53 may monitor teleportations and teleportation invites. Avatars that accept a teleportation invite may be candidates for object selection. In this case, if multiple avatars teleport to the same region within a specified period of time, those avatars may be candidates for object selection as they may be traveling and rendered together in the virtual universe.

Several manual approaches are also available for selecting an object of interest in the virtual universe. For example, in one embodiment, the user of an avatar may specify an object or group of objects as objects of interest. The selection may be performed via an input device by selecting the object and invoking the appropriate method. Such selection may be permanent, or ephemeral, wherein degraded avatars may be subsequently rendered fully if the user specifies. This user selection may apply only to the specific object selected, or to all objects of that type within the virtual universe or a region within the virtual universe.

In another example, a user may specify a term or terms that are of interest to the user. Such selection may be performed through a configuration system on virtual universe server client 24. Objects that contain metadata that match the user specified term or terms are presented to the user as potential objects of interest. For example, a user may specify the term "football" as a subject of interest. Upon entering a region within the virtual universe, objects containing metadata terms related to the term "football" may be selected as objects of interest. Further, this may also be invoked automatically, wherein objects in the virtual universe are compared to the metadata of items within the personal inventory of the avatar.

In yet another example, the owner of a region or the creator of a virtual universe may specify objects as objects of interest. For example, it may be desirable for a virtual region storeowner to ensure that each avatar has unobstructed views of a product that the storeowner is trying to sell. The virtual region storeowner may annotate the metadata for the object with instructions to render the object as an object of interest. Region owners may wish to tag a plurality of objects within a region as objects of interest including, but not limited to: store signs, salespeople, cashiers, objects for sale, security/safety officers, etc.

Although a group of avatars within a proximity to the object of interest has been degraded, these avatars may still partially occlude the avatar's view, or appear "blurred" as they move in front of the object of interest. To help the object of interest stand out even further, the appearance of the object of interest may be modified. In one embodiment, modification component 82 is configured to enhance an appearance of the object of interest to increase a visual contrast between the object of interest and the occluding avatars. For example, brighter colors and/or additive lighting may give the object of interest a slight glow to make it more noticeable. Or, the object of interest may also be enlarged so as to be more prominent behind the occluding avatars. It will be appreciated that these modifications represent a few non-limiting examples of enhancements that can be made to the object of interest, and that many other approaches are possible within the scope of the present invention.

In another embodiment of this invention, degradation tool 53 is used as a service to charge fees for facilitating the degradation of avatar appearances in the virtual universe. As shown in FIG. 5, degradation tool 53 comprises a transaction component 88 configured to charge a transaction fee for degrading avatar appearances in the virtual universe. In this embodiment, the provider of the virtual universe or a third party service provider could offer this transaction as a service by performing the functionalities described herein on a subscription and/or fee basis. In this case, the provider of the virtual universe or the third party service provider can create, deploy, maintain, support, etc., degradation tool 53 that performs the processes described herein. In return, the virtual universe or the third party service provider can receive payment from the virtual universe residents via universe economy management component 70 and commercial transaction management component 72 (FIG. 4).

In still another embodiment, the methodologies disclosed herein can be used within a computer system to provide degraded avatar appearances in the virtual universe. In this case, degradation tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
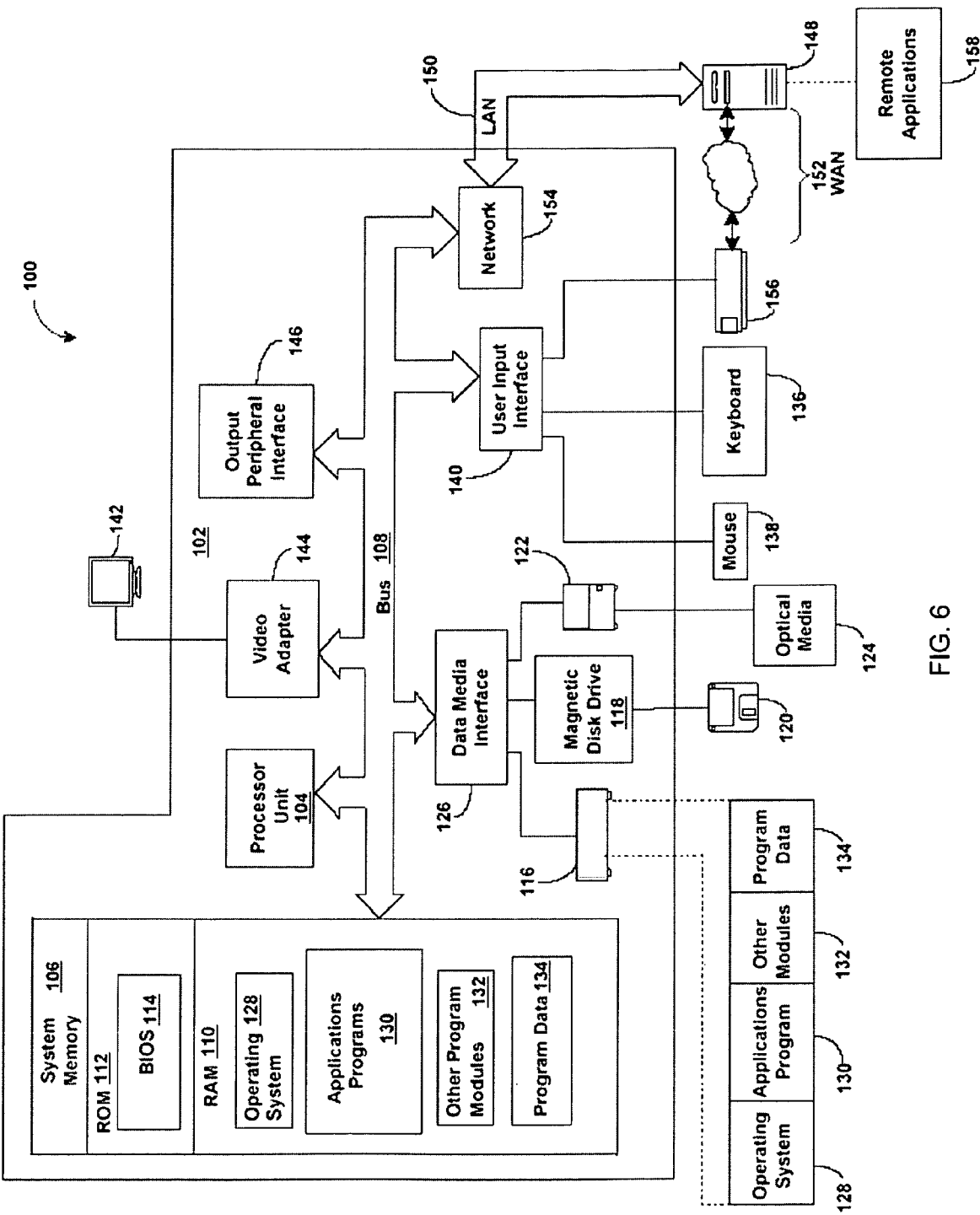
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the invention described herein. Neither should computing environment 100 be interpreted as having any dependency or requirement relating to any one or combination of components illustrated in FIG. 6.

In the computing environment 100 there is a computer 102, which is operational with numerous other general purpose or special purpose computing system environments or configurations. Examples of well known computing systems, environments, and/or configurations that may be suitable for use with computer 102 include, but are not limited to, personal computers, server computers, thin clients, thick clients, handheld or laptop devices, multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 6, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including server array 14 and virtual universe client 24. In one embodiment, the one or more application programs 130 include components of degradation tool 53, such as visual obstruction component 80, alternative component 82, and transaction component 88.

Figure 7:
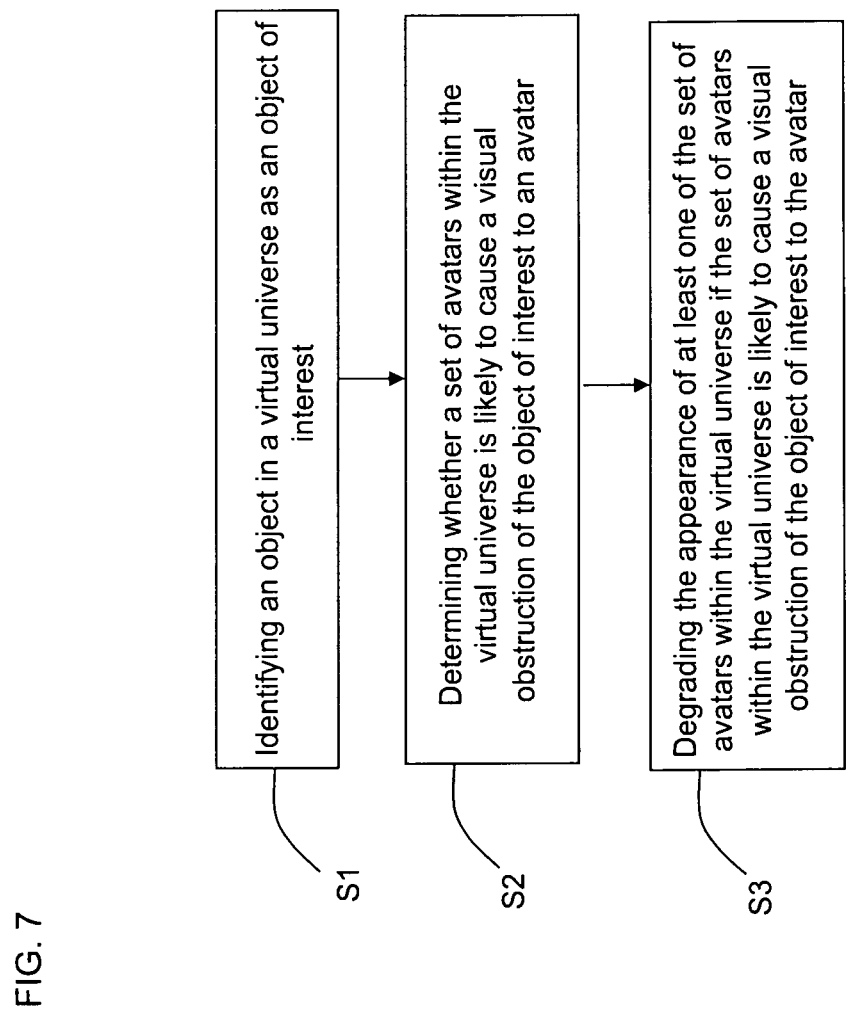
FIG. 7 shows a flow diagram of a method for degrading avatar appearances in a virtual universe according to embodiments of the invention.

The one or more program modules 130 carry out the methodologies disclosed herein, as shown in FIG. 7. According to one embodiment, in step S1, an object within the virtual universe is identified as an object of interest. In S2, it is determined whether a set of avatars within the virtual universe is likely to cause a visual obstruction of the object of interest to an avatar. In S3, the appearance of at least one of the set of avatars within the virtual universe is degraded if the set of avatars within the virtual universe is likely to cause a visual obstruction of the object of interest to the avatar. The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 6, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention embodiments for degrading avatar appearances in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for degrading avatar appearances in a virtual universe, the method comprising:

monitoring a set of teleportation invitations issued to avatars in the virtual universe, the teleportation invitations comprising invitations to teleport to a region within the virtual universe;

identifying an object in the virtual universe as an object of interest based on a social tag;

identifying a set of avatars that have each accepted at least one of the set of teleportation invitations;

determining whether the set of avatars is likely to cause a visual obstruction of the object of interest to an avatar other than the set of avatars, the determining comprising calculating whether a number of avatars of the set of avatars that shall be rendered, as a result of having accepted at least one of the set of teleportation invitations, within a predetermined proximity to the object of interest exceeds a predefined threshold;

rendering the set of avatars in the virtual universe per the accepted at least one of the set of teleportation invitations, at least one of the rendered set of avatars having a degraded appearance if the set of avatars within the virtual universe is likely to cause a visual obstruction of the object of interest to the avatar other than the set of avatars, enhancing an appearance of the object of interest to increase a visual contrast between the object of interest and the set of avatars in response to the degrading; and charging a rendering fee for facilitating the degradation of avatar appearances in the virtual universe;

wherein the degrading comprises reducing at least one geometric dimension of the at least one of the set of avatars.

2. The method according to claim 1, the determining comprising determining whether the set of avatars is touching a line of sight between the object of interest and the avatar.

3. The method according to claim 2, the degrading comprising degrading the appearance of the at least one of the set of avatars within the virtual universe in response to a determination that the set of avatars is touching the line of sight between the object of interest and the avatar.

4. The method according to claim 3, the object of interest comprising at least one of the following: an object in the virtual universe that is being viewed by the avatar, at least one of the set of avatars that has had a past interaction with the avatar, an object in the virtual universe that is being viewed by a plurality of avatars from the set of avatars, an object in the virtual universe that is within a rendering radius of a plurality of avatars from the set of avatars, an object selected by the avatar as an object of interest, an object that matches metadata in an inventory of the avatar, an object selected by an administrator of the virtual universe, or an object in which an entity associated with the object has paid a fee.

5. The method according to claim 1, the reducing comprising at least one of the following: wireframe rendering or polygon reduction.

6. A computer system for degrading avatar appearances in a virtual universe, comprising:

at least one processing unit;

memory operably associated with the at least one processing unit; and a degradation tool storable in memory and executable by the at least one processing unit, the degradation tool comprising:

a visual obstruction component configured to:

monitor a set of teleportation invitations issued to avatars in the virtual universe, the teleportation invitations comprising invitations to teleport to a region within the virtual universe;

identify an object in the virtual universe as an object of interest based on a match between a metadata term of the object and a preselected keyword;
identify a set of avatars that have each accepted at least one of the set of teleportation invitations;
make a determination as to whether the set of avatars within the virtual universe is likely to cause a visual obstruction of the object of interest to an avatar other than the set of avatars, the determination comprising a calculation of whether a number of avatars of the set of avatars that shall be rendered, as a result of having accepted at least one of the set of teleportation invitations, within a predetermined proximity to the object of interest exceeds a predefined threshold;
enhance an appearance of the object of interest to increase a visual contrast between the object of interest and the set of avatars in response to a reduction of at least one geometric dimension of at least one of a plurality of avatars of the set of avatars; and
a modification component configured to:
make the reduction of the at least one geometric dimension of the at least one of the plurality of avatars of the set of avatars, in response to teleportation of the plurality of avatars being complete, to a plurality of levels of degradation within the virtual universe if the set of avatars within the virtual universe is likely to cause a visual obstruction of the object of interest to the avatar other than the set of avatars,
a transaction component configured to:
charge a rendering fee for facilitating the reduction of the at least one geometric dimension of the at least one of the plurality of avatars.

7. The computer system according to claim 6, the visual obstruction component further configured to determine whether the set of avatars is touching a line of sight between the object of interest and the avatar.

8. The computer system according to claim 7, the degrading being in response to a determination that the set of avatars is touching the line of sight between the object of interest and the avatar.

9. The computer system according to claim 8, the object of interest comprising at least one of the following: an object in the virtual universe that is being viewed by the avatar, at least one of the set of avatars that has had a past interaction with the avatar, an object in the virtual universe that is being viewed by a plurality of avatars from the set of avatars, an object in the virtual universe that is within a rendering radius of a plurality of avatars from the set of avatars, an object selected by the avatar as an object of interest, an object that matches metadata in an inventory of the avatar, an object selected by an administrator of the virtual universe, or an object in which an entity associated with the object has paid a fee.

10. The computer system according to claim 6, the modification component further configured to perform at least one of the following: wireframe rendering or polygon reduction.

11. A computer-readable storage device storing computer instructions, which when executed, enables a computer system to degrade avatar appearances in a virtual universe, the computer instructions comprising:
monitoring a set of teleportation invitations issued to avatars in the virtual universe, the teleportation invitations comprising invitations to teleport to a region within the virtual universe;
identifying an object in the virtual universe as an object of interest, the identifying being based on at least one of: a social tag, and a match between a metadata term of the object and a preselected keyword;
identifying a set of avatars that have each accepted at least one of the set of teleportation invitations;
determining whether the set of avatars within the virtual universe is likely to cause a visual obstruction of the object of interest to an avatar other than the set of avatars, the determining comprising calculating whether a number of avatars of the set of avatars that shall be rendered, as a result of having accepted at least one of the set of teleportation invitations, within a predetermined proximity to the object of interest exceeds a predefined threshold;
degrading an appearance of at least one of the set of avatars within the virtual universe if the set of avatars within the virtual universe is likely to cause a visual obstruction of the object of interest to the avatar other than the set of avatars; and
enhancing an appearance of the object of interest to increase a visual contrast between the object of interest and the set of avatars in response to the degrading;
charging a rendering fee for facilitating the degradation of avatar appearances in the virtual universe;
wherein the degrading comprises reducing at least one geometric dimension of the at least one of the set of avatars.

12. The computer-readable storage device according to claim 11 further comprising instructions for determining whether the set of avatars within the virtual universe is touching a line of sight between the avatar and the object of interest.

13. The computer-readable storage device according to claim 12, the degrading being in response to a determination that the set of avatars is positioned in the line of sight between the avatar and the object of interest.

14. The computer-readable storage device according to claim 13, the object of interest comprising at least one of: an object in the virtual universe that is being viewed by the avatar, at least one of the set of avatars that has had a past interaction with the avatar, an object in the virtual universe that is being viewed by a plurality of avatars from the set of avatars, an object in the virtual universe that is within a rendering radius of a plurality of avatars from the set of avatars, an object selected by the avatar as an object of interest, an object that matches metadata in an inventory of the avatar, an object selected by an administrator of the virtual universe, or an object in which an entity associated with the object has paid a fee.

15. The computer-readable storage device according to claim 11, the reducing comprising at least one of wireframe rendering or polygon reduction.

16. A method for deploying a degradation tool for use in a computer system that degrades avatar appearances in a virtual universe, comprising: providing a computer infrastructure operable to:
monitor a set of teleportation invitations issued to avatars in the virtual universe, the teleportation invitations comprising invitations to teleport to a region within the virtual universe;
identify an object in the virtual universe as an object of interest based on at least one of a social tag, and a match between a metadata term of the object and a preselected keyword;
identify a set of avatars that have each accepted at least one of the set of teleportation invitations;
make a determination as to whether a set of avatars within the virtual universe is likely to cause a visual obstruction of the object of interest to an avatar other than the set of avatars, the determination comprising a calculation of whether a number of avatars of the set of avatars that shall be rendered, as a result of having accepted at least one of the set of teleportation invitations, within a predetermined proximity to the object of interest exceeds a predefined threshold; and degrade an appearance of at least one of a plurality of avatars of the set of avatars, in response to teleportation of the plurality of avatars being complete, to a plurality of levels of degradation within the virtual universe if the set of avatars within the virtual universe is likely to cause a visual obstruction of the object of interest to the avatar other than the set of avatars;

enhance an appearance of the object of interest to increase a visual contrast between the object of interest and the set of avatars in response to the degradation; and charge a rendering fee for facilitating the degradation of avatar appearances in the virtual universe;

wherein the degrade step comprises reducing at least one geometric dimension of the at least one of the set of avatars.

* * * * *